United States Patent
Kim et al.

(10) Patent No.: US 10,069,182 B2
(45) Date of Patent: Sep. 4, 2018

(54) SOLUBLE CATALYST FOR LITHIUM-AIR BATTERY

(71) Applicants: Hyundai Motor Company, Seoul (KR); Seoul National University R&DB Foundation, Seoul (KR)

(72) Inventors: Won Keun Kim, Gyeonggi-do (KR); Kyoung Han Ryu, Gyeonggi-do (KR); Hee Dae Lim, Seoul (KR); Ki Suk Kang, Seoul (KR); Byung Ju Lee, Seoul (KR)

(73) Assignees: Hyundai Motor Company, Seoul (KR); Seoul National University R&DB Foundation, Seoul (KR)

(*) Notice: Subject to any disclaimer, the term of this patent is extended or adjusted under 35 U.S.C. 154(b) by 43 days.

(21) Appl. No.: 15/190,357

(22) Filed: Jun. 23, 2016

(65) Prior Publication Data
US 2017/0149105 A1 May 25, 2017

(30) Foreign Application Priority Data
Nov. 20, 2015 (KR) .................. 10-2015-0163516

(51) Int. Cl.
*H01M 12/08* (2006.01)
*H01M 4/38* (2006.01)
(Continued)

(52) U.S. Cl.
CPC ............. *H01M 12/08* (2013.01); *B60L 11/18* (2013.01); *H01M 4/382* (2013.01);
(Continued)

(58) Field of Classification Search
CPC .... H01M 12/08; H01M 4/382; H01M 4/9008; H01M 2220/20; H01M 2250/20;
(Continued)

(56) References Cited

U.S. PATENT DOCUMENTS 7,585,590 B2 * 9/2009 Wang ................ H01M 10/0525
429/199
2008/0096061 A1 4/2008 Burchardt
(Continued)

FOREIGN PATENT DOCUMENTS

JP 2009-283411 A 12/2009
JP 2011-515795 A 5/2011
(Continued)

OTHER PUBLICATIONS

Lim, Hee-Dae, et al. "Superior Rechargeability and Efficiency of Lithium-Oxygen Batteries: Heirarchical Air Electrode Architecture Combined with a Soluble Catalyst," Angewandte Communications (2014) pp. 3926-3931.
(Continued)

*Primary Examiner* — Gregg Cantelmo
(74) *Attorney, Agent, or Firm* — Mintz Levin Cohn Ferris Glovsky and Popeo, P.C.; Peter F. Corless (57) ABSTRACT

A soluble catalyst for a lithium-air battery is provided. The soluble catalyst including a redox mediator (RM) has an ionization energy of about 5.5 to 7.5 eV under vacuum or an oxidation potential of 3.0 to 4.0 V and is well dissolved in an electrolyte without reacting with the electrolyte. In addition, the soluble catalyst has a HOMO level in an original state (RM), which is less than a formation energy of lithium peroxide ($Li_2O_2$) but maximally close to the formation energy, and has a HOMO level in an oxidized state ($RM^+$), which is greater than a HOMO level of the electrolyte.

9 Claims, 10 Drawing Sheets

(51) Int. Cl.
 *H01M 4/90* (2006.01)
 *B60L 11/18* (2006.01)

(52) U.S. Cl.
 CPC ...... *H01M 4/9008* (2013.01); *H01M 2220/20* (2013.01); *H01M 2250/20* (2013.01); *H01M 2300/0025* (2013.01); *H01M 2300/0091* (2013.01); *Y02E 60/128* (2013.01)

(58) Field of Classification Search
 CPC .. H01M 2300/0025; H01M 2300/0091; B60L 11/18; Y02E 60/128
 See application file for complete search history.

(56) References Cited

U.S. PATENT DOCUMENTS

| | | |
|---|---|---|
| 2009/0288946 A1 | 11/2009 | Kinlen et al. |
| 2012/0135278 A1* | 5/2012 | Yoshie ................. H01M 8/188 429/7 |
| 2013/0000703 A1* | 1/2013 | Lee ......................... H01G 9/20 136/252 |
| 2013/0224538 A1* | 8/2013 | Jansen ................. H01M 8/188 429/72 |
| 2014/0370405 A1 | 12/2014 | Zhang et al. |

FOREIGN PATENT DOCUMENTS

| | | |
|---|---|---|
| JP | 2011-134594 A | 7/2011 |
| JP | 2011-171072 A | 9/2011 |
| WO | 2011-133982 A1 | 10/2011 |

OTHER PUBLICATIONS

Chen, Y. et al., "Charging a Li-O2 battery using a redox mediator," Nature Chemistry (2013), pp. 489-494.

\* cited by examiner

SOLUBLE CATALYST FOR LITHIUM-AIR BATTERY

CROSS-REFERENCE TO RELATED APPLICATION

This application claims under 35 U.S.C. § 119 a the benefit of Korean Patent Application No. 10-2015-0163516 filed on Nov. 20, 2015, the entire contents of which are incorporated herein by reference.

TECHNICAL FIELD

The present invention relates to a catalyst, and more particularly, to a soluble catalyst, for a lithium-air battery. The soluble catalyst may include a redox mediator (RM) that has an ionization energy of about 5.5 to 7.5 eV under vacuum or an oxidation potential of about 3.0 to 4.0 V and is well dissolved in an electrolyte and not reacted with the electrolyte. Further, the redox mediator (RM) has a HOMO (highest energy occupied molecular orbital) level in an original state (RM), which is less than a formation energy of lithium peroxide ($Li_2O_2$) but maximally close to the formation energy, and has a HOMO level in an oxidized state ($RM^+$), which is greater than a HOMO level of the electrolyte.

BACKGROUND

Currently, problems such as the depletion of fossil fuel, environmental pollution, and global warming according to the high-speed growth have been increasing. As a countermeasure thereto, a new and renewable energy has been developed, but notable outcomes have not been achieved. Accordingly, an interest in an energy storage technology, particularly a battery field, has increased.

For instance, advanced development has been achieved in a lithium ion battery. However, the conventional lithium ion batteries are insufficient to replace fossil fuel due to a low energy density thereof. In addition, recently, a metal-air battery such as a lithium-air battery has been actively developed.

The lithium-air battery uses oxygen supplied from air without any restriction as an active material. Theoretically, sufficiently high energy density may be obtained from the lithium-air battery, for example, of about 3,200 Wh/kg, which is about 10 times greater than that of the conventional lithium ion battery. Further, since oxygen is used as the active material, the lithium-air battery is environmentally friendly.

However, the conventional lithium-air battery has a drawback of a short life-span and an over-voltage due to high polarization. In particular, when the battery is discharged, lithium peroxide ($Li_2O_2$) may be generated and ion conductivity of lithium peroxide is low. Therefore, when lithium peroxide covers an air electrode (cathode) of the lithium-air battery, high polarization occurs and thus energy efficiency is remarkably reduced. Accordingly, the an important research subject in the lithium-air battery may be the development of an appropriate catalyst decomposing lithium peroxide.

An early lithium-air battery of the related art used a solid oxygen generation catalyst. Since the aforementioned catalyst was a solid phase, it was difficult to bring the catalyst into contact with lithium peroxide which was the same solid phase. As a result, since activity of the catalyst was low, the aforementioned problem could not be solved. Recently, research for a soluble catalyst (soluble catalyst) has been actively conducted. Since the soluble catalyst may freely move in the electrolyte, the soluble catalyst may come into contact with lithium peroxide more easily.

The soluble catalyst includes a redox mediator decomposing lithium peroxide while being oxidized and reduced. For instance, it has been reported in the related art that tetrathiafulvalene (TTF) as the redox mediator of the soluble catalyst for the lithium-air battery. Further, the present inventor has suggested lithium iodide (LiI) as another alternative that may be usable as the redox mediator. Accordingly, the present inventor has strived to concentrate on research for developing a novel advanced soluble catalyst solving the problems of the lithium-air battery, thereby reaching the present invention.

The above information disclosed in this Background section is merely for enhancement of understanding of the background of the invention and therefore it may contain information that does not form the prior art that is already known in this country to a person of ordinary skill in the art.

SUMMARY OF THE DISCLOSURE

The present invention provides a soluble catalyst that may effectively decompose lithium peroxide generated when a lithium-air battery is discharged. In addition, the present invention provides a compound that may be usable as the soluble catalyst for a lithium-air battery.

The object of the present invention is not limited to the aforementioned objects. The object of the present invention will be more clear by the following description and realized by means and a combination thereof described in the claims.

The present invention may include the following constitution in order to accomplish the aforementioned objects.

In one aspect, the present invention provides a catalyst for a lithium-air battery. In particular, the catalyst of the present invention may be soluble in an electrolyte used in the lithium-air batter. The term "soluble catalyst" as used herein, refers to a catalyst or a catalyst composition that is dissolved in various types of the liquid or semi-solid electrolyte (e.g., solid-state gel electrolyte), a solution of an electrolyte or a solvent constituting an electrolyte. In addition, the electrolyte may include various solvents used in the related art of manufacturing a battery (e.g. lithium-air battery), for example, an aprotic solvent (non-aqueous or organic solvent, either polar or non-polar), a protic or aqueous solvent or mixtures thereof. Hereinafter, the catalyst may be referred to the soluble catalyst unless otherwise indicated.

Further, the catalyst may comprise a redox mediator (RM) which may have an ionization energy of about 5.5 to 7.5 eV under vacuum and may be dissolved in an electrolyte. As used herein, the term "redox mediator" refers to a molecule or a compound that may accept or donate electrons thereby promoting electron transfer process in a matrix or a system, e.g. catalyst in a lithium-air battery.

The catalyst for the lithium-air battery according to the present invention may include the redox mediator having an oxidation potential that is greater than an equilibrium potential of $Li_2O_2$.

The oxidation potential of the redox mediator may be about 3.0 to 4.0 V.

The electrolyte may be triethylene glycol dimethyl ether (TEGDME) or dimethyl sulfoxide (DMSO).

The redox mediator may be an organic compound that is not reacted with the electrolyte.

Preferably, a highest occupied molecular orbital (HOMO) level of the redox mediator may be less than a formation energy of $Li_2O_2$.

Preferably, an ionization energy of the redox mediator may be of about 4.5 to 6.0 eV in the electrolyte.

Preferably, a HOMO level of the redox mediator in an oxidized state may be greater than a HOMO level of the electrolyte.

The redox mediator may be selected from the group consisting of 5,10-dimethylphenazine (DMPZ), 1,5-naphthalenediamine (NDA), 4,N,N-trimethylaniline (TMA), and 1-phenylpyrrolidine (PPD).

In another aspect, the present invention provides a lithium-air battery that may comprise the catalyst as described herein.

Further provided is a vehicle that may include the lithium-air battery comprising the catalyst as described herein.

According to various exemplary embodiments, the present invention may provide a catalyst effectively decomposing lithium peroxide generated when a lithium-air battery is discharged to reduce the degree of polarization. In addition, compounds that may be as the catalyst, i.e. soluble catalyst, may be provided.

The effect of the present invention is not limited to the aforementioned effects. It should be understood that the effect of the present invention includes all effects which can be inferred from the following description.

Other aspects and preferred embodiments of the invention are discussed infra.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The descriptions of publicly known constitutions or functions thereof may be omitted if it is judged that they make the gist of the present invention unclear.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

A lithium-air battery is a battery system using lithium as an anode and using oxygen of air as an active material of a cathode (air electrode). At the anode, oxidation and reduction reactions of lithium occur, and at the cathode, reduction and oxidation reactions of oxygen flowing from the outside occur.

The following Chemical Formulae 1 and 2 represent the reactions occurring at the anode and the cathode when the lithium-air battery is discharged.

(Anode): $Li \rightarrow Li^+ + e^-$ [Chemical Formula 1]

(Cathode): $2Li^+ + O_2 + 2e^- \rightarrow Li_2O_2$ [Chemical Formula 2]

A lithium metal of the anode is oxidized to generate lithium ions and electrons. The lithium ions are moved through an electrolyte, and the electrons are moved through external wires or current collectors to the cathode. Since the cathode is porous, external air may flow into the cathode. Oxygen included in external air is reduced by the electrons at the cathode, and $Li_2O_2$ is formed.

The process of a charging reaction is the opposite to the above described reactions. In other words, as in the following Chemical Formula 3, $Li_2O_2$ is decomposed at the cathode to generate the lithium ions and electrons.

(Cathode) $Li_2O_2 \rightarrow 2Li^+ + O_2 + 2e^-$ [Chemical Formula 3]

When $Li_2O_2$ is not properly decomposed, a reduction problem of energy efficiency due to the aforementioned high polarization phenomenon may occur.

In one aspect, the soluble catalyst for the lithium-air battery (hereinafter, referred to as 'soluble catalyst') according to the present invention may effectively decompose $Li_2O_2$ by promoting the reaction of Chemical Formula 3. Accordingly, energy efficiency of the battery may be increased and a life-span thereof may be increased.

The soluble catalyst may promote the reaction of Chemical Formula 3 through the redox mediator (RM).

A mechanism of the redox mediator will be described in brief below.

[Chemical Formula 4]

$2RM \rightarrow 2RM^+ + 2e^-$   1.

$Li_2O_2 + 2RM^+ \rightarrow 2Li^+ + O_2 + 2RM$   2.

When the lithium-air battery is charged, the redox mediator may be oxidized first. Since the redox mediator ($2RM^+$) in an oxidized state is dissolved in the electrolyte, the redox mediator may come into contact with $Li_2O_2$ more easily.

Then, the redox mediator in the oxidized state may bring electrons from $Li_2O_2$. As a result, $Li_2O_2$ may be decomposed into $2Li^+$ and $O_2$ efficiently, and the redox mediator in the oxidized state may be reduced to return to an original state.

To smoothly operate the aforementioned mechanism, or alternately, to promote decomposition of $Li_2O_2$, the redox mediator may need to chemically decompose $Li_2O_2$. Thus, the oxidation potential (or oxidation voltage) of the redox mediator needs to be greater than the equilibrium potential of $Li_2O_2$. Due to high over potential (e.g., greater than about 1.5 V) of electrochemical decomposition of $Li_2O_2$, the redox mediator may be oxidized prior to $Li_2O_2$.

However, when a difference between the oxidation potential and the equilibrium potential of $Li_2O_2$ is substantially increased, charging and discharging efficiency (discharging voltage/charging voltage) may deteriorate since a voltage applied to the battery is increased. Therefore, the oxidation potential of the redox mediator needs to be greater than the equilibrium potential of $Li_2O_2$, and preferably, oxidation potential of the redox mediator may be close to the equilibrium potential of $Li_2O_2$ within a predetermined range.

In particular, since the equilibrium potential of $Li_2O_2$ is about 2.96 V, the oxidation potential of the redox mediator may be in the range of about 3.0 V to 4.0 V.

The aforementioned condition may be described by an ionization energy, since the mechanism of Chemical Formula 4 may start when the redox mediator is oxidized, or in other words, when the redox mediator loses electrons.

In the related art, materials such as tetrathiafulvalene (TTF), ferrocene, and tetramethyl-p-phenylenediamine (TMPD) have been suggested as the redox mediator. For instance, the ionization energies of the those compounds under vacuum may be 6.8 eV, 6.7 eV, and 6.7 eV, respectively and the redox mediator may function as the soluble catalyst when the ionization energy is 5.5 eV to 7.5 eV.

Accordingly, the present inventors have manufactured the lithium-air battery using various organic compounds having the oxidation potential of about 3.0 V to 4.0 V or having the ionization energy of about 5.5 eV to 7.5 eV under vacuum as the redox mediator.

As results, the present invention may provide a soluble catalyst effectively decomposing lithium peroxide generated when a lithium-air battery is discharged to reduce the degree of polarization. In addition, compounds that may be as the soluble catalyst may be provided.

Example

The following examples illustrate the invention and are not intended to limit the same.

The selected organic compounds may include 5,10-dimethylphenazine (hereinafter, referred to as DMPZ), 1,5-naphthalenediamine (hereinafter, referred to as NDA), 4,N,N-trimethylaniline (hereinafter, referred to as TMA), 1-phenylpyrrolidine (hereinafter, referred to as PPD), and naphthacene (hereinafter, referred to as NC), and physical properties thereof are described in the following Table 1.

TABLE 1

| Name | Structural Formula | Ionization energy under vacuum [eV]+ | Oxidation potential in the electrolyte (TEGDME) [V] |
|---|---|---|---|
| TTF | (tetrathiafulvalene structure) | 6.34 | 3.42 |
| Lithium iodide | — | N/A | 3.6 |
| NDA | (1,5-naphthalenediamine structure) | 6.51 | 3.64 |
| TMA | (N,N,4-trimethylaniline structure) | 6.79 | 3.81 |
| PPD | (1-phenylpyrrolidine structure) | 6.84 | 3.89 |
| NC | (naphthacene/tetracene structure) | 6.55 | 3.83 |
| DMPZ | (5,10-dimethyl-5,10-dihydrophenazine structure) | 5.89 | 3.10 |

+ Actually calculated value

Manufacturing of Lithium-Air Battery Cell

The cathode (air electrode) was manufactured by applying a mixture of Ketjen black and polytetrafluoroethylene (PTFE) on the nickel mesh (Ni mesh). The lithium metal was used as the anode.

The cell was manufactured by sequentially laminating the lithium metal (anode), the separator, and the cathode. 1M LiTFSI-TEGDME (lithium bis(trifluoromethane)sulfonamide in tetraethylene glycol dimethylether) was used as the electrolyte.

Evaluation of Stability of Redox Mediator

The soluble catalyst including the redox mediator, as used herein, may be dissolved in the electrolyte to be introduced into the cell. Therefore, the redox mediator may be dissolved in the electrolyte. Further, the redox mediator may not need to be reacted with the electrolyte as being stable therein.

Accordingly, after NDA, TMA, PPD, NC, and DMPZ were mixed at a predetermined concentration with the electrolyte, stability was evaluated by FT-IR (Fourier transform infrared spectra). The result is illustrated in FIGS. 1A-1E.

As shown in FIGS. 1A-1E, when the redox mediator and the electrolyte were mixed, peaks of NDA (FIG. 1A), TMA (FIG. 1B), PPD (FIG. 1C), NC (FIG. 1D), and DMPZ (FIG. 1E) disappeared indicating that all of NDA, TMA, PPD, NC, and DMPZ are dissolved in the electrolyte. In addition, no change was shown in peak after 10 days, which indicates NDA, TMA, PPD, NC, and DMPZ are not reacted with the electrolyte but stably exist.

Evaluation of Charging and Discharging of Lithium-Air Battery Cell

The cell was discharged to the limited capacity of 1 mAh, and then charged by applying a predetermined current of 0.2 mA/cm². The charging voltage and the discharging voltage belonged to the range of 2.0 V to 4.5 V. The inside of the cell was adjusted to continuously supply high-purity oxygen.

Figure 1A:
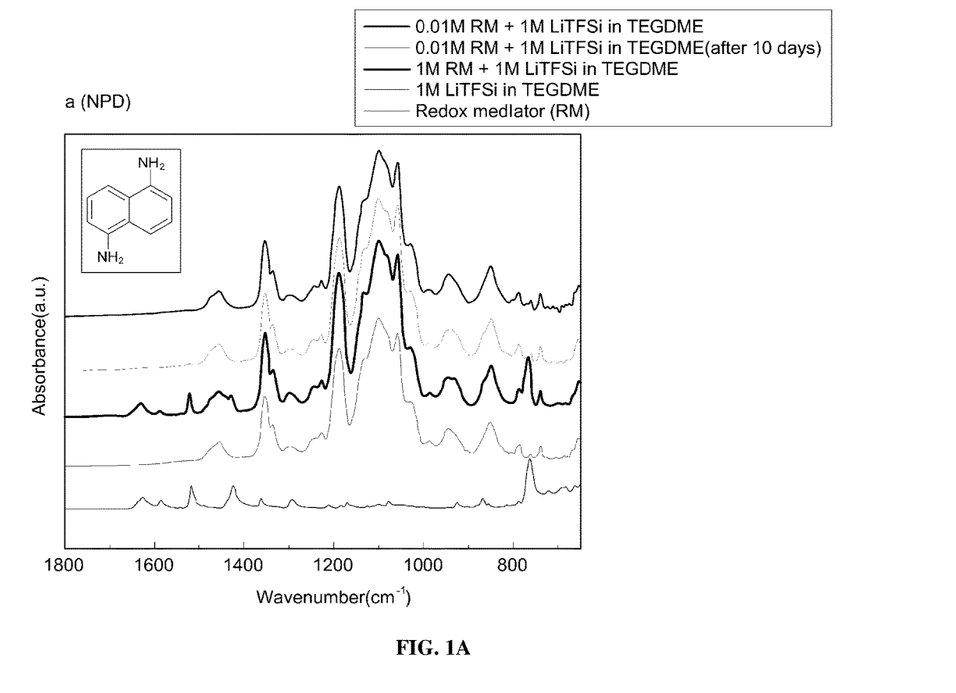
FIG. 1A shows a measurement result of FT-IR (Fourier transform infrared spectra) for evaluating stability of an exemplary redox mediator compound of NDA, when the redox mediator and an electrolyte according to an exemplary embodiment of the present invention are mixed.
Figure 1B:
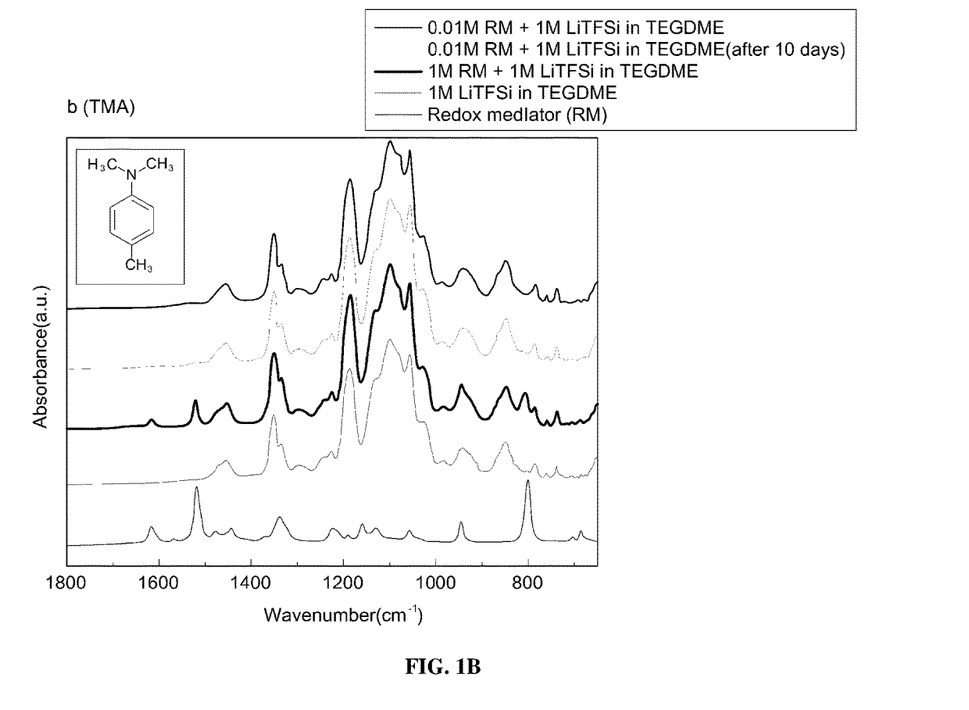
FIG. 1B shows a measurement result of FT-IR (Fourier transform infrared spectra) for evaluating stability of an exemplary redox mediator compound of TMA, when the redox mediator and an electrolyte according to an exemplary embodiment of the present invention are mixed.
Figure 1C:
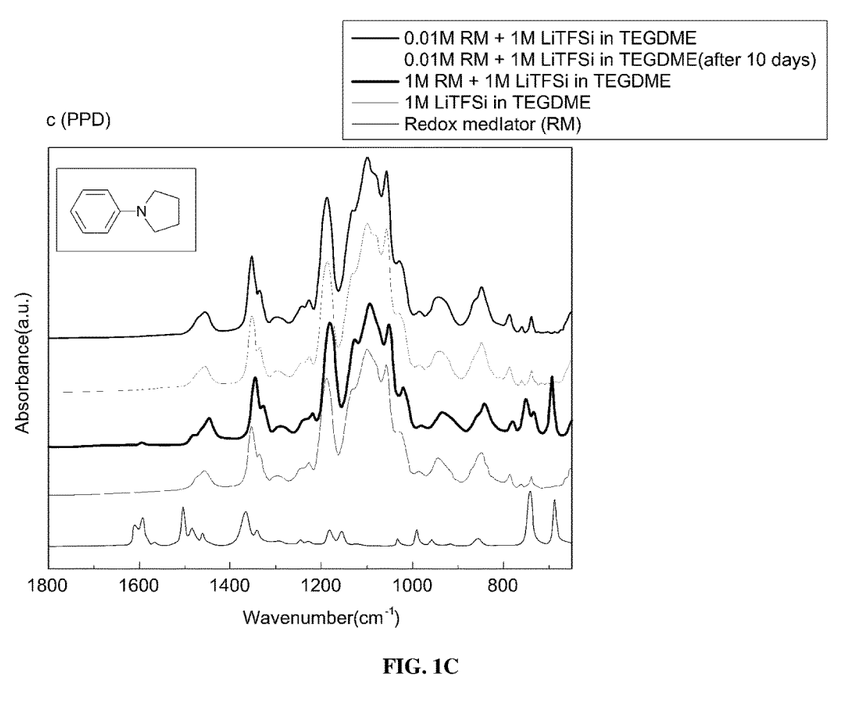
FIG. 1C shows a measurement result of FT-IR (Fourier transform infrared spectra) for evaluating stability of an exemplary redox mediator compound of PPD, when the redox mediator and an electrolyte according to an exemplary embodiment of the present invention are mixed.
Figure 1D:
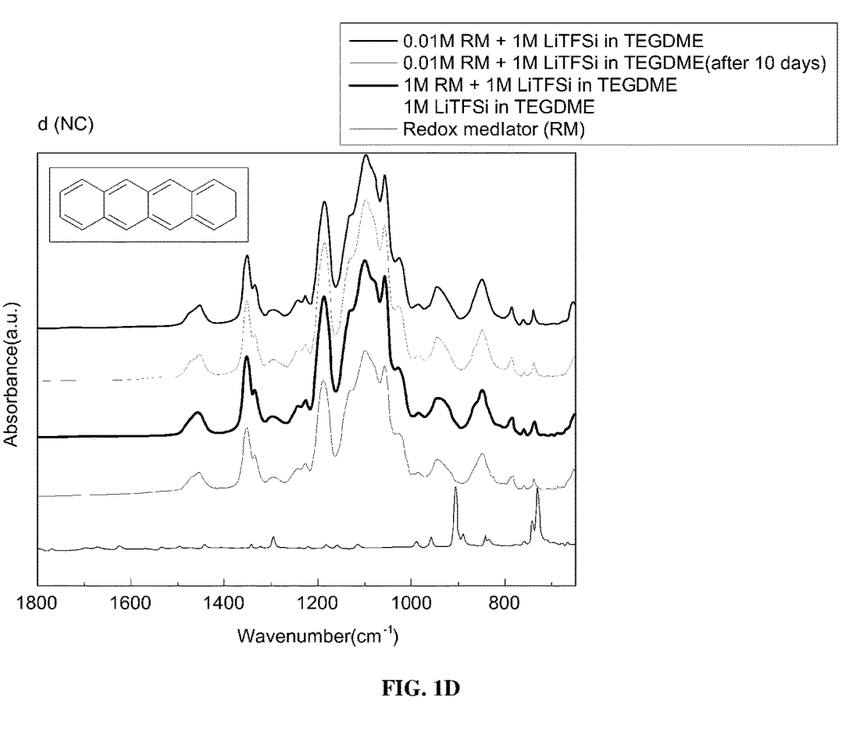
FIG. 1D shows a measurement result of FT-IR (Fourier transform infrared spectra) for evaluating stability of an exemplary redox mediator compound of NC, when the redox mediator and an electrolyte according to an exemplary embodiment of the present invention are mixed.
Figure 1E:
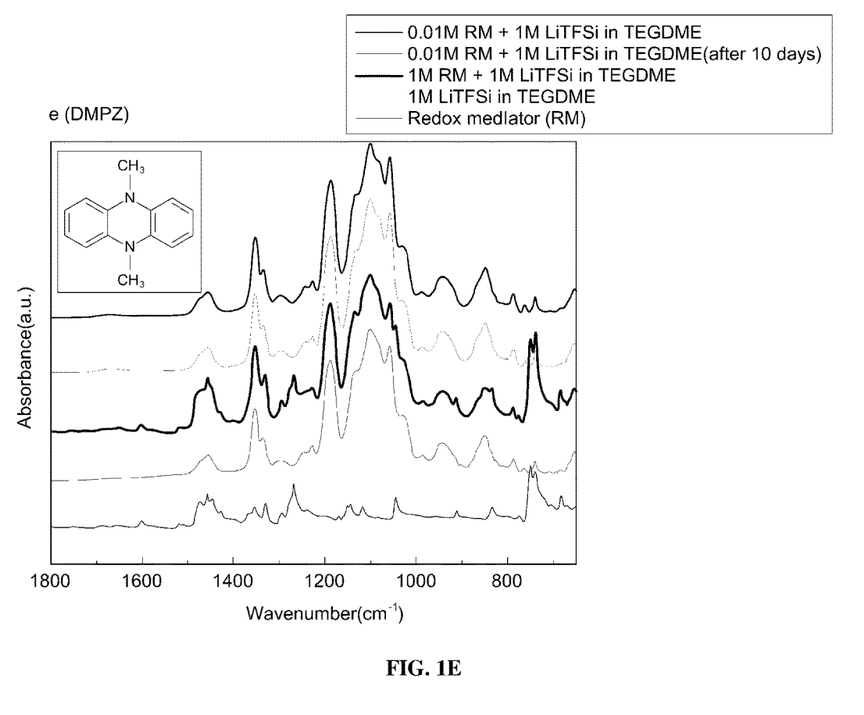
FIG. 1E shows a measurement result of FT-IR (Fourier transform infrared spectra) for evaluating stability of an exemplary redox mediator compound of DMPZ, when the redox mediator and an electrolyte according to an exemplary embodiment of the present invention are mixed.
Figure 2:
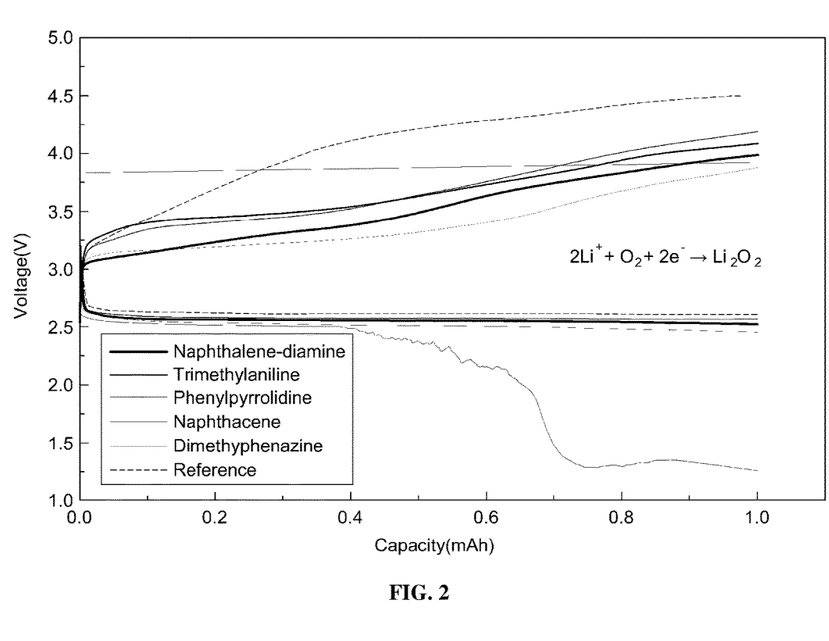
FIG. 2 shows evaluation results of charging and discharging an exemplary cell to which an exemplary soluble catalyst including an exemplary redox mediator according to an exemplary embodiment of the present invention is applied.

The result according to the evaluation of charging and discharging is shown in FIG. 2.

The cell where the soluble catalyst including the redox mediator was not added to the electrolyte was the reference. Each graph illustrates the evaluation result of charging and discharging of the cell where the soluble catalyst including NDA, TMA, PPD, NC, and DMPZ is added to the electrolyte.

As shown in FIG. 2, in the case of the reference, polarization strongly occurred, and thus the high over-charging phenomenon of about 1.5 V was observed.

On the other hand, it can be seen that in the case of the cell including the soluble catalyst, the aforementioned overcharging phenomenon was substantially reduced. As such, when the cell is charged, NDA, TMA, PPD, and DMPZ included in the soluble catalyst may promote the decomposition reaction of $Li_2O_2$. In particular, the cell including DMPZ most effectively reduced the polarization phenomenon.

However, when the cell included NC, discharging performance was unstable. When the cell is discharged under the atmosphere of high-purity oxygen and NC is unstable to light and air, a side reaction may occur. Therefore, NC may be the least suitable for use as the redox mediator.

Measurement of HOMO/LUMO Level of Redox Mediator

As shown in FIG. 2, DMPZ could most effectively decompose $Li_2O_2$. As described above, the degree of promotion (e.g. activity of the catalyst) of the decomposition reaction of $Li_2O_2$ may be changed based on which type of redox mediator is used.

Figure 3:
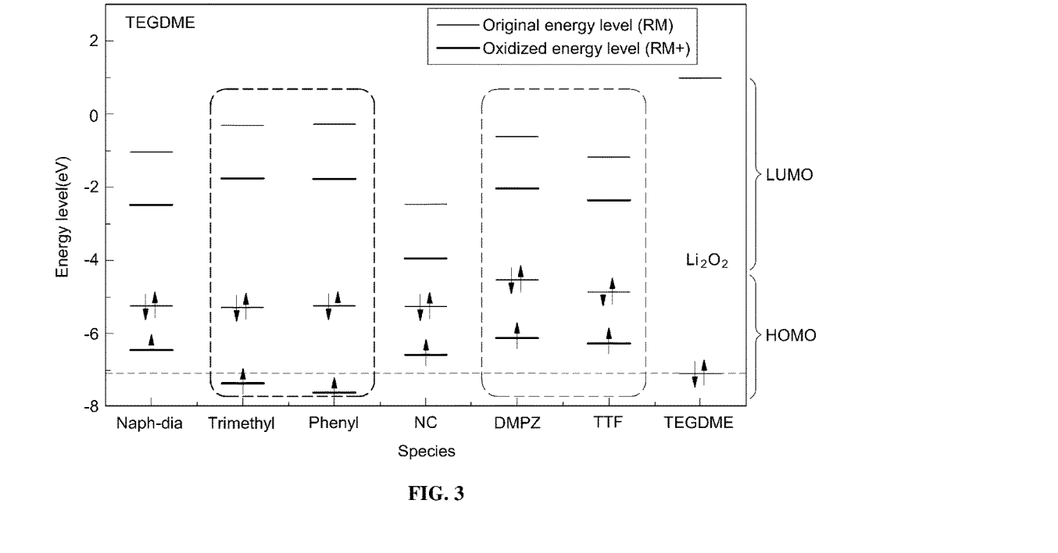
FIG. 3 shows measurement results of HOMO/LUMO levels of an exemplary redox mediator according to an exemplary embodiment of the present invention when triethylene glycol dimethyl ether (TEGDME) is used as an exemplary electrolyte.
Figure 4:
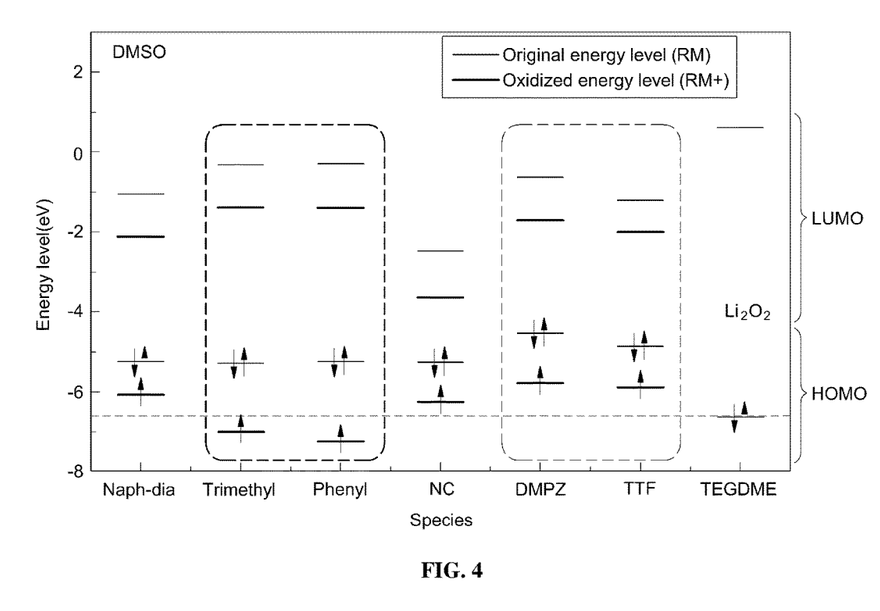
FIG. 4 shows measurement results of the HOMO/LUMO levels of an exemplary redox mediator according to an exemplary embodiment of the present invention when dimethyl sulfoxide (DMSO) is used as an exemplary electrolyte.

To illustrate the above-described situation in view of the ionization energy, the HOMO (highest occupied molecular orbital)/LUMO (lowest unoccupied molecular orbital) levels of NDA, TMA, PPD, NC, and DMPZ in the electrolyte were measured, and the results are shown in FIGS. 3 and 4.

FIG. 3 shows the result when triethylene glycol dimethyl ether (TEGDME) was used as the electrolyte, and FIG. 4 shows the result when dimethyl sulfoxide (DMSO) was used as the electrolyte.

The energy levels of $Li_2O_2$ of FIGS. 3 and 4 represent the formation energy of $Li_2O_2$. The formation energy of $Li_2O_2$ indicates a standard generation energy (at a standard condition, at a temperature of about 25° C. and at a pressure of about 1 atm) of the reaction at cathode as shown in Chemical Formula 2 ($2Li^+ + O_2 + 2e^- \rightarrow Li_2O_2$).

Thus, as shown in FIGS. 3 and 4, all of the HOMO levels of NDA, TMA, PPD, NC, and DMPZ in the original state (RM) are less than the formation energy of $Li_2O_2$.

The HOMO level of the redox mediator in the original state (RM) may be considered as a primary ionization energy of the redox mediator under the presence of the electrolyte. Accordingly, when the HOMO level is less than the formation energy of $Li_2O_2$, the redox mediator may chemically decompose $Li_2O_2$. Due to high over-potential (e.g., greater than about 1.5 V) of electrochemical decomposition of $Li_2O_2$, the redox mediator may be oxidized prior to $Li_2O_2$. As described above, to promote the decomposition reaction of $Li_2O_2$, oxidation of the redox mediator should precede and chemically decompose $Li_2O_2$. (refer to Chemical Formula 4).

Therefore, in order to allow the redox mediator to do a function thereof, the HOMO level in the original state (RM) should be less than the formation energy of $Li_2O_2$.

However, since the charging voltage is increased in the actual cell as the HOMO level is reduced, when the HOMO level is substantially low, charging and discharging efficiency (discharging voltage/charging voltage) may be reduced. Therefore, the redox mediator where the ionization energy (the primary ionization energy in the electrolyte and the HOMO level in the original state) may be in the range of about 4.5 V to 6.0 V, or particularly in the range of about 4.5 V to 5.0 V may be selected.

In addition, as shown in FIGS. 3 and 4, the HOMO levels of TMA and PPD in an oxidized form ($RM^+$) are less than the HOMO level of the electrolyte (TEGDME and DMSO).

Accordingly, the oxidized form ($RM^+$) of TMA and PPD may bring or withdraw electrons from the electrolyte rather than $Li_2O_2$. To decompose $Li_2O_2$, $RM^+$ should come into contact with $Li_2O_2$ to bring the electrons from $Li_2O_2$ as shown in the Chemical Formula 4. However, since the HOMO levels of TMA and PPD in the oxidized form ($RM^+$) are less than the HOMO level of the electrolyte, TMA and PPD may not bring or withdraw electrons from $Li_2O_2$, but bring electrons from electrolyte to be reduced and then return to the original state (RM).

Therefore, efficiency of TMA and PPD as the redox mediator may be insufficient. As a result, the HOMO level of the redox mediator in the oxidized state ($RM^+$) should be higher than the HOMO level of the electrolyte.

Selection of Redox Mediator and Observation of Actual Decomposition of $Li_2O_2$ The redox mediator according to various exemplary embodiments of the present invention will be described below.

1) The redox mediator according to various exemplary embodiments of the present invention may have ionization energy under vacuum that may be of about 5.5 to 7.5 eV or the oxidation potential may be of about 3.0 to 4.0 V 2) The redox mediator according to various exemplary embodiments of the present invention may be well dissolved in the electrolyte but not reacted with the electrolyte 3) The HOMO level of the redox mediator according to various exemplary embodiments of the present invention in the original state (RM) may be less than the formation energy of $Li_2O_2$ but maximally close to the formation energy 4) The HOMO level of the redox mediator according to various exemplary embodiments of the present invention may in the oxidized state (RM+) may be greater than the HOMO level of the electrolyte As discussed above, among NDA, TMA, PPD, NC, and DMPZ, NC may be less used as the redox mediator since NC is less stable to light and oxygen and a side reaction may occur during discharging. Further, as described above, since the HOMO levels of TMA and PPD in the oxidized state (RM+) are lower than the HOMO level of the electrolyte, efficiency of the catalyst may be insufficient. As shown in FIGS. 3 and 4, since the HOMO level of NDA in the original state (RM) is low, there is a concern of an increase in charging voltage of the cell which may lead to a reduction in charging and discharging efficiency.

As results, the soluble catalyst including DMPZ as the redox mediator may be most efficient, since the soluble catalyst including DMPZ is stable in the electrolyte, a side reaction does not occur, polarization and the over-voltage phenomenon may be most largely reduced, and charging and discharging efficiency is sufficient.

Figure 5:
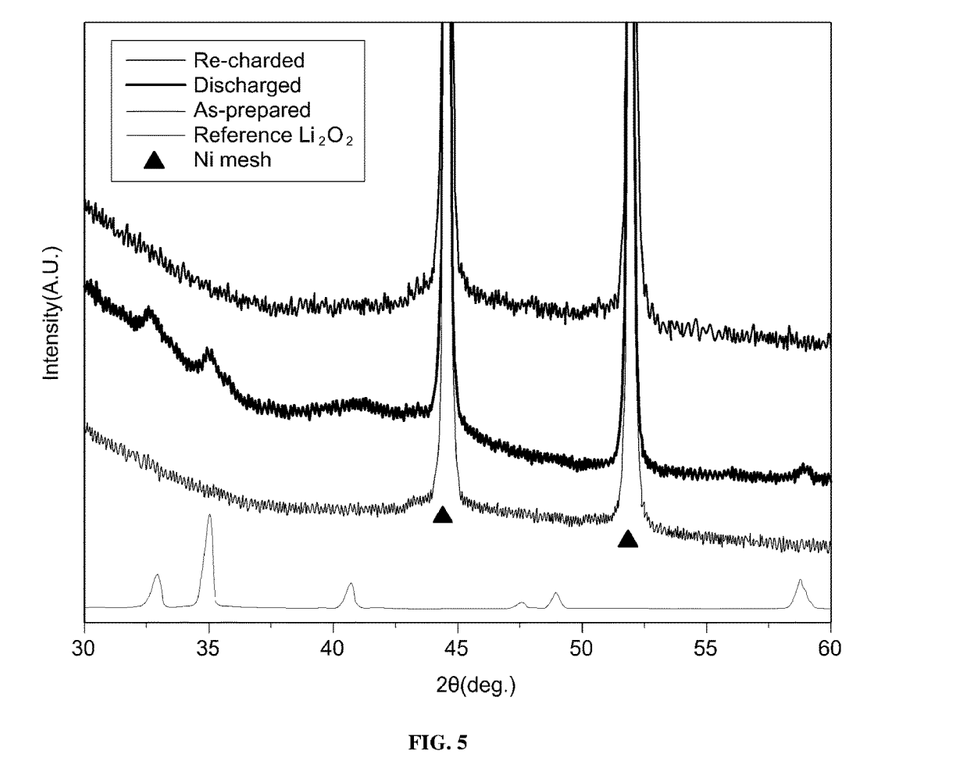
FIG. 5 shows an XRD (X-ray diffraction) analysis result of an exemplary cell to which an exemplary soluble catalyst including 5,10-dimethylphenazine (DMPZ) according to an exemplary embodiment of the present invention is applied when DMPZ is used as an exemplary redox mediator.
Figure 6:
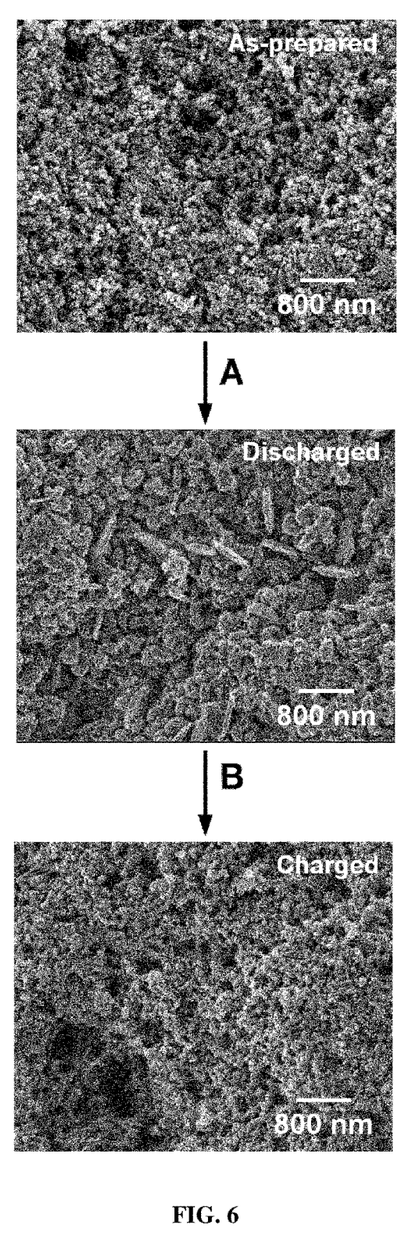
FIG. 6 shows an SEM (scanning electron microscope) analysis image of an exemplary cathode (air electrode) of an exemplary cell of FIG. 5 according to an exemplary embodiment of the present invention.

Therefore, after the cell to which the soluble catalyst including DMPZ as the redox mediator was applied was manufactured, X-ray diffraction (XRD) analysis and scanning electron microscope (SEM) analysis were performed. The results are shown in FIGS. 5 and 6. As shown in FIG. 5, when the cell is charged and discharged, $Li_2O_2$ is decomposed and formed.

As compared to the graph (as-prepared), when the cell is first prepared and the graph (discharged) after the cell is discharged, it can be confirmed that the peak of $Li_2O_2$ appears and $Li_2O_2$ is formed during discharging.

As being compared to the graph (discharged) after the cell is discharged and the graph (re-charged), when the cell is re-charged, it can be confirmed that the peak of $Li_2O_2$ disappears and $Li_2O_2$ is completely decomposed during charging.

As shown in FIG. 6, decomposition and formation of $Li_2O_2$ may be more clearly confirmed. It can be seen that as the lithium-air battery was discharged, a ring-shaped $Li_2O_2$ was formed on the surface of (A) the cathode (air electrode). In addition, when the cell is completely discharged and then re-charged (B), $Li_2O_2$ is completely decomposed and thus is not found any more.

As described above, the present invention provides the compounds that are used as a novel soluble catalyst. In particular, the soluble catalyst of the present invention may effectively decompose $Li_2O_2$ generated when a lithium-air battery is discharged thereby reducing polarization and increasing charging and discharging efficiency and a lifespan. Further, the present invention contributes to subsequent research by finding and suggesting a condition for being used as the soluble catalyst of the lithium-air battery.

The invention has been described in detail with reference to various exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A lithium-air battery, comprising:
a catalyst,
a cathode, and
an anode,
wherein the catalyst comprises:
a redox mediator that is dissolved in an electrolyte,
wherein an ionization energy of the redox mediator is of about 5.5 to 7.5 eV under vacuum state, and
the redox mediator is 5,10-dimethylphenazine (DMPZ), 1,5-naphthalenediamine (NDA), 4,N,N-trimethylaniline (TMA), of 1-phenylpyrrolidine (PPD).

2. The lithium-air battery of claim 1, wherein an oxidation potential of the redox mediator is greater than an equilibrium potential of lithium peroxide ($Li_2O_2$).

3. The lithium-air battery of claim 2, wherein the oxidation potential of the redox mediator is about 3.0 to 4.0 V.

4. The lithium-air battery of claim 1, wherein the electrolyte is triethylene glycol dimethyl ether (TEGDME) or dimethyl sulfoxide (DMSO).

5. The lithium-air battery of claim 1, wherein the redox mediator does not react with the electrolyte.

6. The lithium-air battery of claim 1, wherein a highest occupied molecular orbital (HOMO) level of the redox mediator is less than a formation energy of $Li_2O_2$.

7. The lithium-air battery of claim 1, wherein a highest occupied molecular orbital (HOMO) level of the redox mediator in an oxidized state is greater than a HOMO level of the electrolyte.

8. A vehicle comprising a lithium-air battery of claim 1.

9. The lithium-air battery of claim 2, wherein a highest occupied molecular orbital (HOMO) level of the redox mediator is less than a formation energy of $Li_2O_2$.

* * * * *